(12) United States Patent
Caruel et al.

(10) Patent No.: US 8,430,203 B2
(45) Date of Patent: Apr. 30, 2013

(54) NOISE REDUCTION DEVICE FOR TURBOJET NACELLE WITH MOBILE CHEVRONS, AND ASSOCIATED NACELLE

(75) Inventors: Pierre Caruel, Le Havre (FR); Thierry Marin Martinod, Nesles la Vallee (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/057,935

(22) PCT Filed: Aug. 5, 2009

(86) PCT No.: PCT/FR2009/000980
§ 371 (c)(1),
(2), (4) Date: Feb. 7, 2011

(87) PCT Pub. No.: WO2010/015751
PCT Pub. Date: Feb. 11, 2010

(65) Prior Publication Data
US 2011/0139540 A1 Jun. 16, 2011

(30) Foreign Application Priority Data
Aug. 6, 2008 (FR) ...................... 08 04492

(51) Int. Cl.
*F02K 1/00* (2006.01)
(52) U.S. Cl.
USPC .................. 181/215; 244/1 N; 415/119
(58) Field of Classification Search .............. 181/215; 244/1 N; 415/119
See application file for complete search history.

(56) References Cited

U.S. PATENT DOCUMENTS 3,351,155 A * 11/1967 Hoch et al. ............... 181/215
3,524,588 A * 8/1970 Duval ..................... 239/265.13
3,612,209 A * 10/1971 Vdoviak et al. .............. 60/232
(Continued)

FOREIGN PATENT DOCUMENTS

DE 102006019299 11/2007
EP 1884650 2/2008
(Continued)

OTHER PUBLICATIONS

International Searc Report; PCT/FR2009/000980; Nov. 25, 2009.

*Primary Examiner* — Forrest M Phillips
(74) *Attorney, Agent, or Firm* — Brinks Hofer Gilson & Lione

(57) ABSTRACT

The invention relates to a turbojet nacelle (1) and to an aeroacoustic noise reduction device for said nacelle, the nacelle comprising a nozzle (10) on the downstream end thereof, said nozzle (10) comprising an inner wall inside which a first flow from the turbojet circulates and an outer wall (102) outside which a second flow corresponding to the surrounding outside air circulates. The invention also relates to an aeroacoustic noise reduction device (20) of the turbojet, comprising a plurality of chevrons (201) arranged on the circumference of the nozzle (10). The invention is characterized in that the aeroacoustic noise reduction device also comprises a slide (202) arranged on the circumference of the nozzle in such a way that it can rotate about the axis of the nozzle, each chevron (201) being connected to the slide (202) by means of a guiding element (204) that can move along the slide (202) during the rotation thereof in order to ensure the displacement of the chevron (201).

13 Claims, 4 Drawing Sheets

U.S. PATENT DOCUMENTS

| | | | |
|---|---|---|---|
| 3,976,160 A * | 8/1976 | Hoch et al. | 181/215 |
| 4,754,924 A * | 7/1988 | Shannon | 239/127.3 |
| 6,220,546 B1 * | 4/2001 | Klamka et al. | 244/129.4 |
| 7,735,601 B1 * | 6/2010 | Stieger et al. | 181/213 |
| 7,883,049 B2 * | 2/2011 | Nesbitt et al. | 244/1 N |
| 7,966,826 B2 * | 6/2011 | Alkislar et al. | 60/770 |

FOREIGN PATENT DOCUMENTS

| | | |
|---|---|---|
| FR | 2868131 | 9/2005 |
| GB | 2372779 | 9/2002 |
| WO | 2007122368 | 11/2007 |
| WO | 2008045090 | 4/2008 |

* cited by examiner

NOISE REDUCTION DEVICE FOR TURBOJET NACELLE WITH MOBILE CHEVRONS, AND ASSOCIATED NACELLE

TECHNICAL FIELD

The invention relates to a turbojet nacelle equipped with a noise reduction device for the noise created by the turbojet engine.

BACKGROUND

A nacelle generally has a tubular structure comprising an air intake upstream of the turbojet, a middle section intended to surround the turbojet case, a downstream section housing thrust reverser means and intended to surround the gas generator, as well as, most often, a jet nozzle whereof the outlet is situated downstream of the turbojet engine.

Nacelles are intended to house a single- or dual-flow turbojet engine.

In general, part of the noise caused by an aircraft turbojet is generated by the ejection speed of the burnt gases, coming from the jet nozzle of the nacelle, and more specifically by the meeting between the burnt gases thus expelled by the jet nozzle and the surrounding outside air.

Reducing the noise, in particular during takeoff phases of the aircraft, constitutes one of the high priority objectives in the design of turbojet engines and the associated nacelles.

To that end, it is known to make part of the inner wall of the intake structure of the nacelle in the form of a cellular structure in which the power of the sound waves is damped.

To that end, also known are nacelles whereof the downstream section has cutouts in the form of chevrons to better mix the flow of burnt gases from the turbojet with the surrounding outside air, and to thereby reduce the noise annoyances generated by the turbojet engine.

However, these chevrons are generally fixed, which has an impact on the aircraft's performance.

For example, the amount of fuel consumed relative to a smooth jet nozzle increases at a comparable thrust.

For that reason, devices have been proposed making it possible both to reduce the aeroacoustic noise from the turbojet engine, in particular in the takeoff phase, substantially without damaging the performance of the aircraft during the other flight phases of the aircraft.

This is for example the case of the device presented in document FR 2 868 131, which proposes a nacelle jet nozzle with variable geometry adapted for a dual-flow turbojet engine. "Dual-flow turbojet engine" refers to a turbojet capable of generating, via the rotating fan blades, a hot air flow (or primary flow) coming from the combustion chamber of the turbojet engine, and a cold air flow (or secondary flow) that circulates outside the turbojet through a jet formed between a fairing of the turbojet and an inner wall of the nacelle, the two air streams ejected from the turbojet through the rear of the nacelle being made to mix with the surrounding outside air flow.

BRIEF SUMMARY

One aim of the invention is to propose a nacelle including a device for reducing aeroacoustic noise with variable geometry having an alternative design.

Another aim is to propose an aeroacoustic noise reduction device with variable geometry having an alternative design, intended to be installed on the turbojet nacelle.

It is also desirable to propose an aeroacoustic noise reduction device with variable geometry offering control of the mixing effect between the flows of gas coming from the turbojet and the surrounding air and a reduction of the aerodynamic losses despite the presence of chevrons.

To that end, the invention proposes a turbojet nacelle comprising a nozzle on the downstream end thereof, said nozzle comprising an inner wall inside which a first flow from the turbojet circulates and an outer wall outside which a second flow corresponding to the surrounding outside air circulates, and an aeroacoustic noise reduction device of the turbojet, comprising a plurality of chevrons arranged on the circumference of the nozzle, remarkable in that the aeroacoustic noise reduction device also comprises a slide arranged on the circumference of the nozzle in such a way that it can rotate about the axis of the nozzle, each chevron being connected to the slide by means of a guiding element that can move along the slide during the rotation thereof in order to ensure the displacement of the chevron.

To that end, the invention also proposes an aeroacoustic noise reduction device of a turbojet including a plurality of chevrons intended to be arranged on the circumference of a turbojet nacelle nozzle, remarkable in that it also comprises a slide arranged on the circumference of the nozzle and capable of rotating around the axis of said nozzle, each chevron being connected to the slide via a guiding element likely to move along the slide during rotation thereof to ensure the movement of said chevron.

Owing to the present invention, it is thus possible to propose a nacelle equipped with an aeroacoustic noise reduction device, in particular useful during the takeoff or landing phase of an aircraft, in which the chevrons can orient or retract themselves, which allows better control of the aerodynamic losses of the turbojet engine, in particular in phases other than the takeoff or landing of the aircraft, related to the presence of the device in question.

It advantageously offers a good compromise between the acoustic efficiency of the aeroacoustic noise reduction device and the aerodynamic losses associated with the presence of said device during flight.

According to specific embodiments of the invention, the device can comprise one or several of the following features, considered alone or according to all technically possible combinations:

- the aeroacoustic noise reduction device also comprises a plurality of levers each mounted at one of their ends on the slide via the guiding element, each lever also being fastened at its opposite end to a chevron such that the chevron is capable of being moved in rotation;
- the slide is a circumferential ring mounted between the inner wall and the outer wall of the nozzle, the radius of which is variable such that each chevron can be moved in rotation around an axis tangent to the circumference of the nozzle;
- each chevron has a trapezoidal shape;
- the slide has a wavy or triangular shape depending on the circumference of the nozzle, such that each chevron can be moved in translation between a first position in which the chevron is retracted between the inner and outer walls of the nozzle, and a second position corresponding to an extended position of the chevron;
- the nacelle comprises a plurality of guide rails, arranged between the inner wall and the outer wall of the nozzle, to guide each chevron between the first position and the second position;

the nacelle comprises a guide rail on either side of each chevron, so as to ensure independent guiding for each chevron;

each guide rail corresponding to a female shape, the corresponding chevron has corresponding male lateral shapes;

two chevrons arranged successively on the circumference of the nozzle are inclined differently to improve the mixing between the first flow and the second flow representing the surrounding outside air;

a first chevron is arranged parallel to the inner wall of the nozzle, the following chevron being arranged parallel to the outer wall of the nozzle;

the nacelle comprises a rack actuated by an electrical motor, or by an electrical or hydraulic jack to ensure the rotation of the slide around the circumference of the nozzle.

BRIEF DESCRIPTION OF THE DRAWINGS

Other features, aims and advantages of the present invention will appear upon reading the following detailed description, according to embodiments provided as non-limiting examples, and done in reference to the appended drawings, in which:

FIG. 2 shows three position positions, called closed, neutral and open, respectively, of the chevrons of the aeroacoustic noise reduction device of the nacelle illustrated in FIG. 1a;

DETAILED DESCRIPTION

Figure 1A:
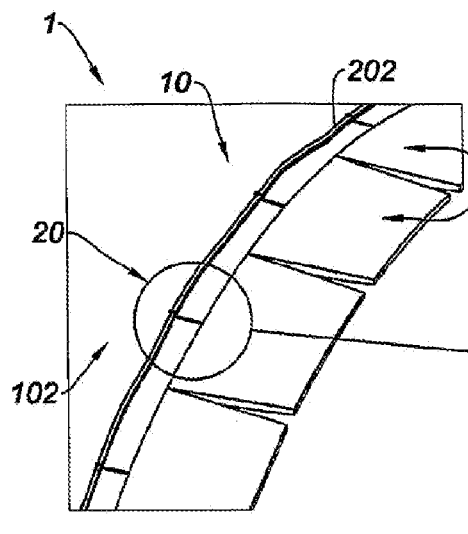
FIG. 1a shows a view of a nacelle including an aeroacoustic noise reduction device according to a first embodiment according to the invention.
Figure 1B:
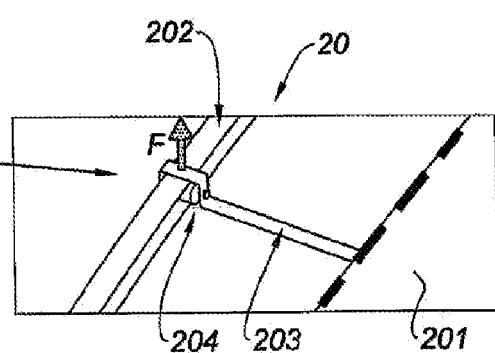
FIG. 1b shows a detail view of FIG. 1a on the slide and the guiding element of the aeroacoustic noise reduction device of the nacelle.
Figure 2:
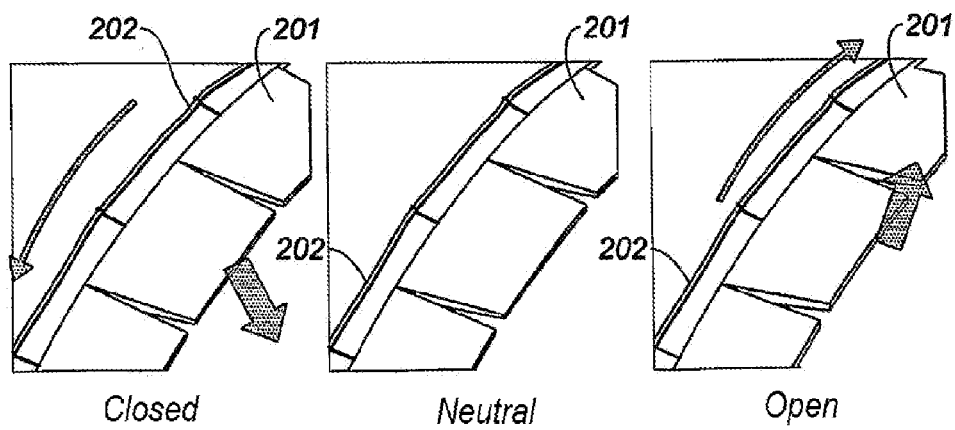

FIGS. 1a, 1b and 2 show a first embodiment of the invention.

A turbojet nacelle 1 is provided having, at its downstream end, a nozzle 10, the nozzle 10 comprising an inner wall inside which a first flow circulates coming from the turbojet and an outer wall 102 outside which a second flow circulates corresponding to the surrounding outside air.

The nacelle 1 also comprises a device 20 for reducing the aeroacoustic noise from the turbojet including a plurality of chevrons 201 arranged on the circumference of the nozzle 10.

According to the invention, the aeroacoustic noise reduction device of the turbojet comprises a slide 202 arranged on the circumference of the nozzle 10 and capable of rotating around the axis of said nozzle 10, each chevron being connected to the slide 202 via a guiding element 204 capable of moving along the slide 202 during the rotation thereof to ensure the movement of the chevron 201.

Preferably, this guiding element 204 is a roller.

According to this first embodiment, the slide 202 is a circumferential ring mounted between the inner wall 101 and the outer wall 102 of the nozzle 10, the radius of which is variable such that each chevron 201 is capable of being moved in rotation around an axis tangent to the circumference of the nozzle 10.

To that end, the aeroacoustic noise reduction device also comprises a plurality of levers 203 each mounted at one of their ends on the slide 202 via the roller 204 and at their opposite end to a chevron 201 such that the chevron 201 is capable of being moved in rotation.

Indeed, if for example the radius of the ring 202 decreases relative to a neutral position (so-called "open" diagram 3 of FIG. 2), then the chevron 201 tends to rise towards the outer wall 102 of the nozzle 10 while rotating around its axis of rotation.

However, if the radius of the ring 202 increases relative to a neutral position (central diagram in FIG. 2 or arrow F in FIG. 1), then the chevron tends to descend towards the inner wall 101 of the nozzle 10 while rotating around its axis of rotation (so-called "closed" diagram 1 of FIG. 2).

In this way, each chevron 201 can thus be oriented as desired, and is therefore adaptable depending on the flight phases of the aircraft.

It is thus possible to vary the section of the nozzle 10 of the nacelle according to the different flight phases of the aircraft.

The mixing effect is then controlled between the flow from the turbojet and the surrounding air.

The shape of the chevrons 201 is not critical for the interests of the invention.

However, in this first embodiment, a trapezoidal shape has the advantage of allowing complete blocking between two adjacent chevrons 201 to prevent any passage of air between the chevrons in the closed position, this passage of air being harmful to the aim of reducing the noise.

A second embodiment is illustrated with the support of FIGS. 3 to 7.

In this second embodiment, the slide 202 for example has a wavy shape (FIG. 4) or a triangular shape (FIG. 5) depending on the circumference of the nozzle 10.

Figure 3:
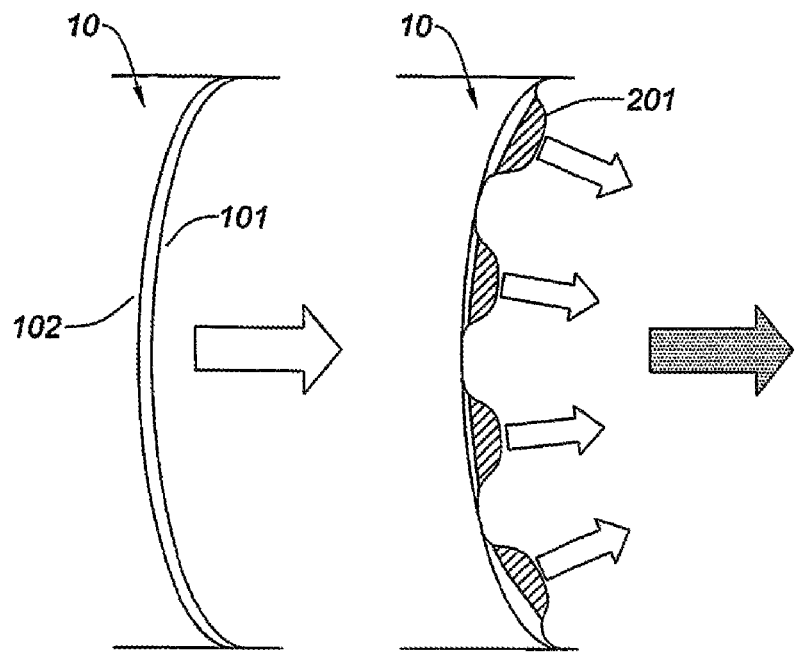
FIG. 3 shows a diagrammatic view of a nacelle including an aeroacoustic noise reduction device according to a second embodiment of the invention, and for which it is possible to see the action of the device on the possible chevron positions, in the retracted position—on the left—and the extended position—on the right—, respectively.
Figures 4, 5:
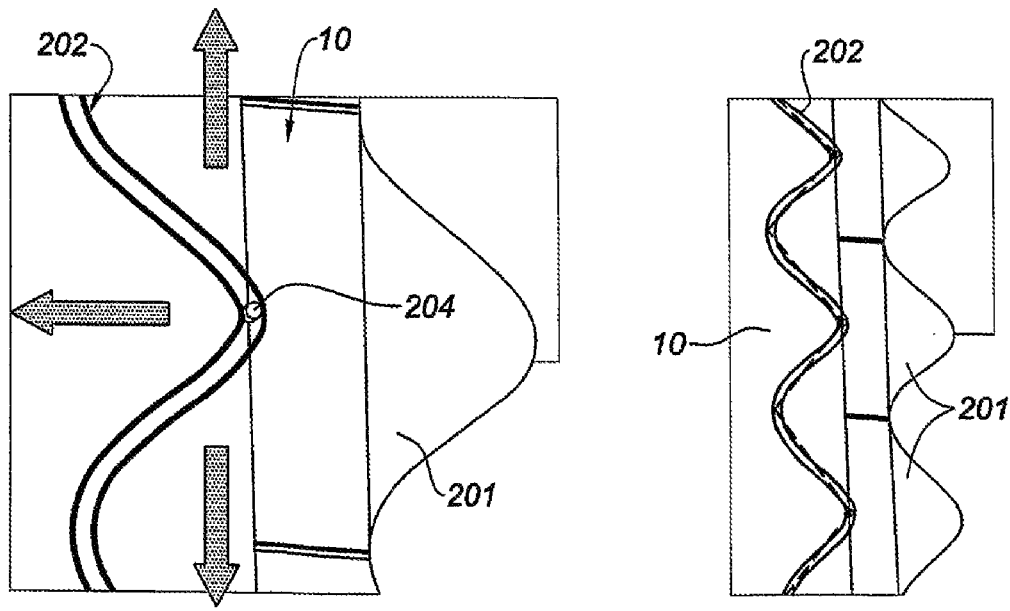
FIG. 4 more precisely shows a slide, having a wavy and quasi-sinusoidal shape, of the aeroacoustic noise reduction device according to the second embodiment of the invention.
FIG. 5 shows an embodiment of a slide, having a triangular shape, of the aeroacoustic noise reduction device according to the second embodiment of the invention.
Figure 6:
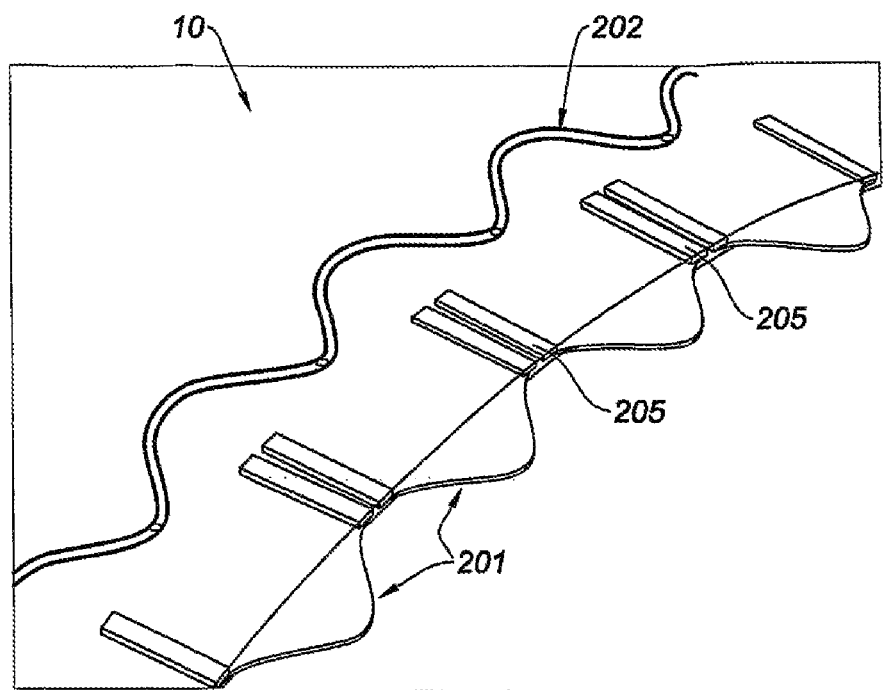
FIG. 6 shows an overall view of the aeroacoustic noise reduction device according to the second embodiment of the invention, with a slide according to the alternative embodiment of FIG. 4.
Figure 7:
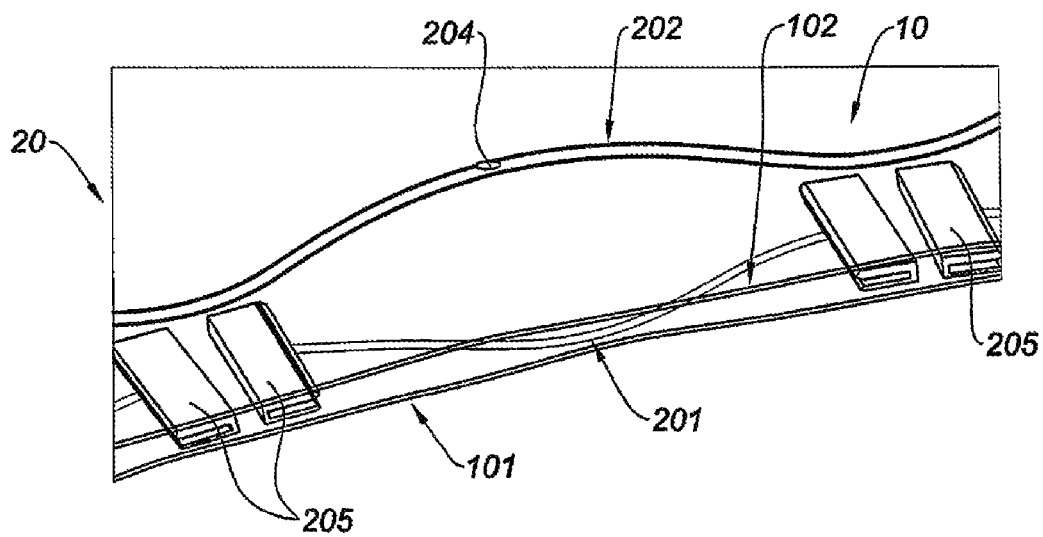
FIG. 7 shows a detail view of FIG. 6 on the rails of the aeroacoustic noise reduction device according to the second embodiment of the invention.

Such a shape makes it possible to make the distance change between the slide 202 and the trailing edge of the nozzle 10, such that each chevron 201 is capable of being moved in translation between a first position in which the chevron is retracted, as illustrated in FIG. 3, on the left and FIG. 7, between the inner walls 101 and outer walls 102 of the nozzle 10, and a second position corresponding to an extended position of the chevron as illustrated in FIG. 3, on the right and FIGS. 4, 5 and 6.

It is thus possible to completely retract the chevrons, and to go back to having a nacelle behaving, aerodynamically, like a nacelle not having any aeroacoustic noise reduction device.

This is particularly advantageous when the aircraft is in flight to reduce aerodynamic losses during flight, and thereby decrease the related fuel consumption.

Also then provided is a plurality of guide rails 205, arranged between the inner wall 101 and the outer wall 102 of the nozzle 10, to guide each chevron 201 between the first, retracted position and the second, extended position.

Preferably, a guide rail 205 is provided on either side of each chevron 201, so as to ensure independent guiding for each chevron 201.

In one alternative embodiment, each guide rail 205 corresponds to a female shape, the corresponding chevron 201 consequently having corresponding male lateral shapes.

In FIG. 7, for example, each rail has a generally U-shaped section.

It is also possible to consider an alternative embodiment applicable to both of the embodiments described above, and shown in FIGS. 8 and 9.

Indeed, it is possible to install the aeroacoustic noise reduction device such that two adjacent chevrons 201 on the circumference of the nozzle 10 are inclined differently, in order to improve the mixing between the first flow coming from the turbojet and the surrounding outside air by making the chevrons 201 interfere with the first flow, then the outside air, consecutively.

Figure 8:
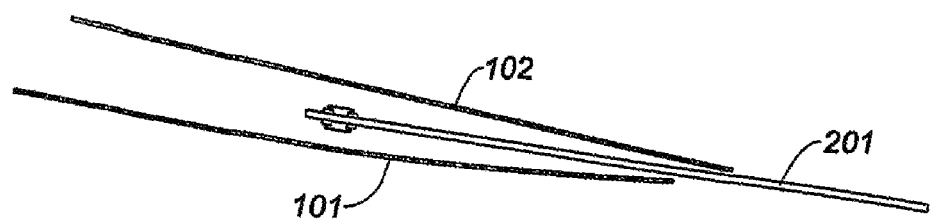
FIG. 8 shows a cross-sectional view of the inner and outer walls of the nozzle of the nacelle with a chevron, and positioned parallel to the inner wall of the nozzle.
Figure 9:
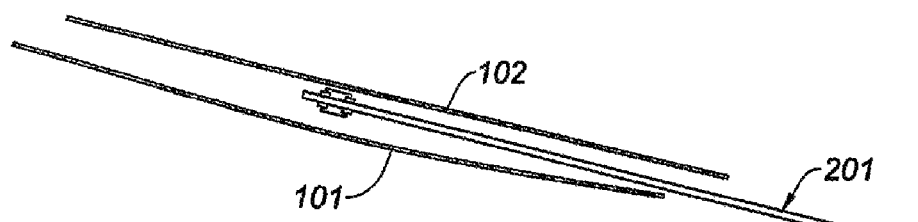
FIG. 9 shows a cross-sectional view of the inner and outer walls of the nozzle of the nacelle with another chevron, adjacent to the chevron illustrated in FIG. 8, in a position parallel to the outer wall of the nozzle forming an aerodynamic line of the surrounding outside air.

More precisely, it is possible to consider having a first chevron 201 arranged parallel to the inner wall 101 of the nozzle 10 (FIG. 9), the following chevron 201 being arranged parallel to the outer wall 102 of the nozzle (FIG. 8).

Figure 10:
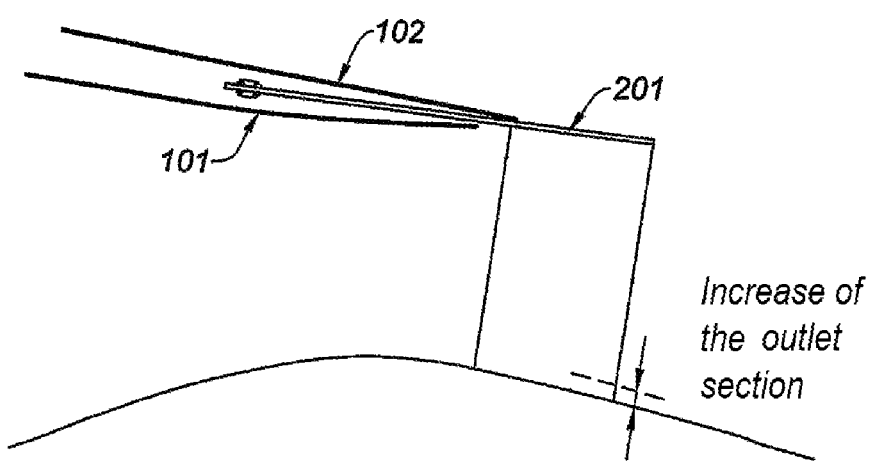
FIG. 10 shows a cross-sectional view of the inner and outer walls of the nozzle of the nacelle with a chevron as illustrated in FIG. 8, in an extended position, making it possible to view the increase of the corresponding nozzle section.

It will be noted that deploying a chevron parallel to the outer wall 102 of the nozzle of course makes it possible to increase the outlet section of the nacelle, but that the output flow rate of the first flow remains limited by the outlet area in the retracted position (FIG. 10).

The increase in the air flow rate of the nozzle can be about 2% in this case, for a traditional operation representative of takeoff.

Whatever the embodiment considered, it is possible to provide, for ensuring the rotational movement of the slide 202 around the circumference of the nozzle, a rack actuated by an electrical motor, or alternatively by an electric or hydraulic jack.

The invention claimed is:

1. A turbojet nacelle comprising:
   a nozzle on a downstream end thereof, the nozzle comprising an inner wall inside which a first flow from the turbojet circulates and an outer wall outside which a second flow corresponding to surrounding outside air circulates, and
   an aeroacoustic noise reduction device of the turbojet, comprising a plurality of chevrons arranged on a circumference of the nozzle,
   wherein the aeroacoustic noise reduction device also comprises a slide arranged on the circumference of the nozzle in such a way that it can rotate about an axis of the nozzle,
   each chevron being connected to the slide by means of a guiding element that can move along the slide during rotation of the slide in order to ensure displacement of the chevron, the rotation of the slide causing each chevron to rotate around an axis tangent to the circumference of the nozzle.

2. The turbojet nacelle according to claim 1, wherein the aeroacoustic noise reduction device also comprises a plurality of levers each mounted at one of their ends on the slide via the guiding element, each lever also being fastened at an opposite end to a chevron such that the chevron is capable of being moved in rotation.

3. The turbojet nacelle according to claim 1, wherein the slide is a circumferential ring mounted between an inner wall and an outer wall of the nozzle, a radius of which is variable such that each chevron can be moved in rotation around the axis tangent to the circumference of the nozzle.

4. The turbojet nacelle according to claim 1, wherein each chevron has a trapezoidal shape.

5. The turbojet nacelle according to claim 1, wherein the slide has a wavy or triangular shape depending on the circumference of the nozzle, such that each chevron can be moved in translation between a first position in which the chevron is retracted between the inner and outer walls of the nozzle, and a second position corresponding to an extended position of the chevron.

6. The turbojet nacelle according to claim 5, further comprising a plurality of guide rails, arranged between the inner wall and the outer wall of the nozzle, to guide each chevron between the first position and the second position.

7. The turbojet nacelle according to claim 5, further comprising a guide rail on either side of each chevron, so as to ensure independent guiding for each chevron.

8. The turbojet nacelle according to claim 7, wherein each guide rail corresponds to a female shape, the corresponding chevron has corresponding male lateral shapes.

9. The turbojet nacelle according to claim 1, wherein two chevrons arranged successively on the circumference of the nozzle are inclined differently to improve mixing between the first flow and the second flow representing the surrounding outside air.

10. The turbojet nacelle according to claim 9, wherein a first chevron is arranged parallel to the inner wall of the nozzle, the following chevron being arranged parallel to the outer wall of the nozzle.

11. The turbojet nacelle according to claim 1, further comprising a rack actuated by an electrical motor, or by an electrical or hydraulic jack to ensure rotation of the slide around the circumference of the nozzle.

12. An aeroacoustic noise reduction device of a turbojet, comprising:
   a plurality of chevrons intended to be arranged on the circumference of a turbojet nacelle nozzle, and
   a slide arranged on a circumference of the nozzle and capable of rotating around an axis of said nozzle, and
   wherein each chevron being connected to the slide via a guiding element likely to move along the slide during rotation thereof to ensure movement of said chevron, the rotation of the slide causing each chevron to rotate around an axis tangent to the circumference of the nozzle.

13. A turbojet nacelle comprising:
   a nozzle on a downstream end thereof, the nozzle comprising an inner wall inside which a first flow from the turbojet circulates and an outer wall outside which a second flow corresponding to surrounding outside air circulates, and
   an aeroacoustic noise reduction device of the turbojet, comprising a plurality of chevrons arranged on a circumference of the nozzle,
   wherein the aeroacoustic noise reduction device also comprises a slide arranged on the circumference of the nozzle in such a way that it can rotate about an axis of the nozzle, each chevron being connected to the slide by means of a guiding element that can move along the slide during rotation thereof in order to ensure displacement of the chevron, the rotation of the slide causing each chevron to translate upstream or downstream of the nozzle between a first position in which the chevron is retracted between the inner and outer walls of the nozzle, and a second position corresponding to an extended position of the chevron.

\* \* \* \* \*